United States Patent
Tsutsui

(10) Patent No.: US 12,255,284 B2
(45) Date of Patent: Mar. 18, 2025

(54) BATTERY MATERIAL, BATTERY, AND METHOD FOR PRODUCING BATTERY MATERIAL

(71) Applicant: Panasonic Intellectual Property Management Co., Ltd., Osaka (JP)

(72) Inventor: Yasutaka Tsutsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 611 days.

(21) Appl. No.: 17/342,991

(22) Filed: Jun. 9, 2021

(65) Prior Publication Data

US 2021/0305627 A1    Sep. 30, 2021

Related U.S. Application Data

(63) Continuation of application No. PCT/JP2019/031101, filed on Aug. 7, 2019.

(30) Foreign Application Priority Data

Dec. 28, 2018 (JP) .................................. 2018-248604

(51) Int. Cl.
   *H01M 10/0565* (2010.01)
   *H01M 10/058* (2010.01)

(52) U.S. Cl.
   CPC ..... *H01M 10/0565* (2013.01); *H01M 10/058* (2013.01)

(58) Field of Classification Search
   CPC .......................... H01M 10/0565; H01M 10/058
   See application file for complete search history.

(56) References Cited

U.S. PATENT DOCUMENTS

| | | | |
|---|---|---|---|
| 2004/0185347 A1* | 9/2004 | Kim .................. | H01M 10/0568 429/340 |
| 2013/0143129 A1* | 6/2013 | Okamoto ............ | H01M 10/056 429/188 |
| 2015/0364789 A1 | 12/2015 | Ogawa et al. | |
| 2016/0126535 A1* | 5/2016 | Qiao .................. | H01M 10/0481 29/623.5 |

(Continued)

FOREIGN PATENT DOCUMENTS

| | | | | |
|---|---|---|---|---|
| CN | 101195670 A | * | 6/2008 | ............. H01G 11/56 |
| CN | 103107362 A | * | 5/2013 | |

(Continued)

OTHER PUBLICATIONS

The Indian Office Action dated Dec. 30, 2022 for the related Indian Patent Application No. 202147026829.

(Continued)

*Primary Examiner* — Allison Bourke
*Assistant Examiner* — Robert Gene West
(74) *Attorney, Agent, or Firm* — Rimon P.C.

(57) ABSTRACT

A battery material includes a compound having an imidazoline ring and an aromatic ring. The compound has a molecular weight of less than 350. The compound is, for example, 2-benzylimidazoline. The battery material, for example, further includes a solid electrolyte. The solid electrolyte has, for example, a particle shape. The compound is, for example, located between a plurality of particles of the solid electrolyte.

10 Claims, 1 Drawing Sheet

(56) References Cited

U.S. PATENT DOCUMENTS

| | | | | |
|---|---|---|---|---|
| 2018/0342768 A1* | 11/2018 | Kwon | ................... | B60K 17/00 |
| 2018/0355099 A1* | 12/2018 | Yan | ..................... | C07D 271/12 |
| 2019/0348707 A1* | 11/2019 | Ito | ...................... | H01M 10/052 |

FOREIGN PATENT DOCUMENTS

| | | | | |
|---|---|---|---|---|
| EP | 3514862 A1 * | 7/2019 | ........ | H01M 10/0525 |
| JP | 2000-277182 | 10/2000 | | |
| JP | 2006-256883 | 9/2006 | | |
| JP | 2008-123732 | 5/2008 | | |
| JP | 4576662 B2 * | 11/2010 | | |
| JP | 2018-037229 | 3/2018 | | |
| KR | 10-2015-113124 A | 10/2015 | | |

OTHER PUBLICATIONS

International Search Report of PCT application No. PCT/JP2019/031101 dated Oct. 8, 2019.

* cited by examiner

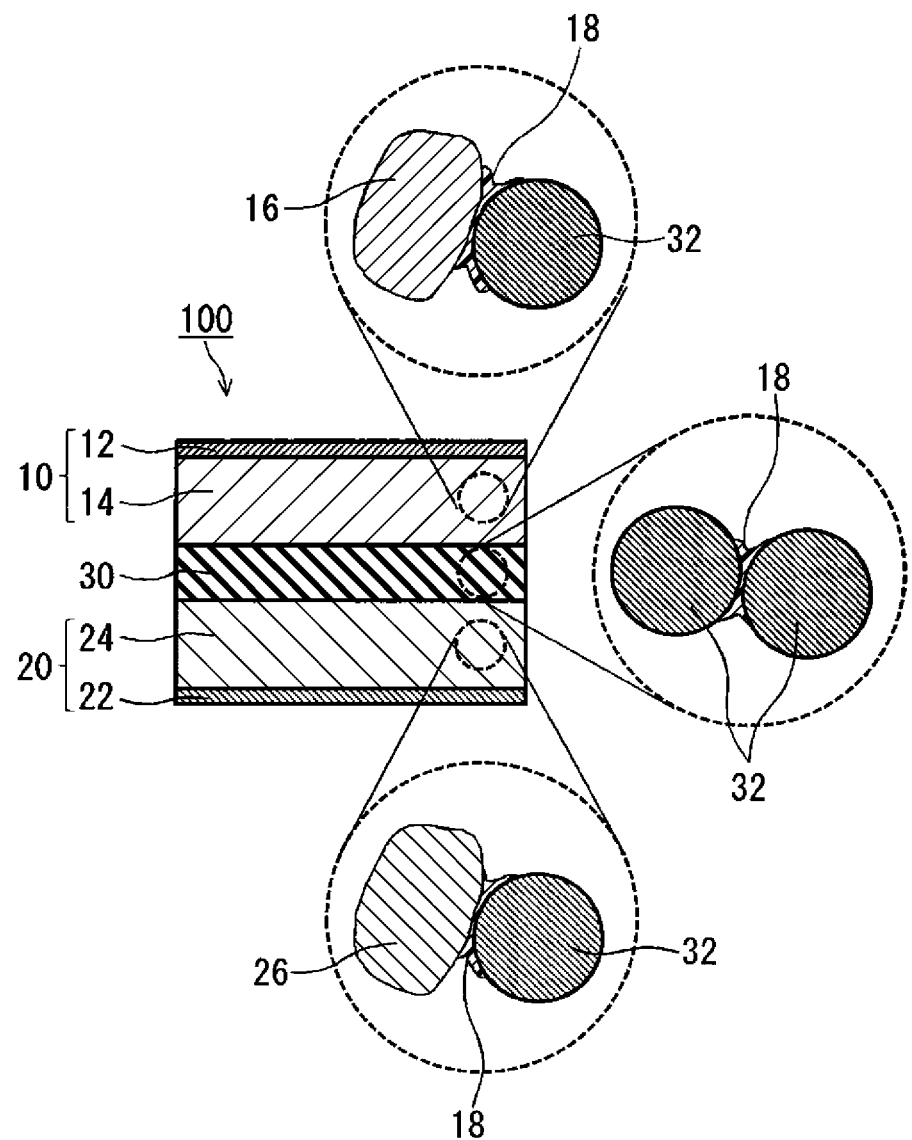

BATTERY MATERIAL, BATTERY, AND METHOD FOR PRODUCING BATTERY MATERIAL

BACKGROUND

1. Technical Field

The present disclosure relates to a battery material, a battery, and a method for producing a battery material.

2. Description of the Related Art

Some battery materials used to form electrolyte layers, electrode layers, and the like in batteries contain a dispersing agent. For example, Japanese Unexamined Patent Application Publication No. 2018-037229 discloses a solid electrolyte composition containing a dispersing agent.

SUMMARY

In existing techniques, it is desired to improve dispersibility in battery materials and ionic conductivity in batteries.

In one general aspect, the techniques disclosed here feature a battery material including a compound having an imidazoline ring and an aromatic ring and a molecular weight of less than 350.

It should be noted that general or specific embodiments of the present disclosure may be implemented as a material, a battery, a device, a system, a method, or any selective combination thereof.

According to an aspect of the present disclosure, it is possible to provide a battery material which has excellent dispersibility and is suitable for improving ionic conductivity in batteries.

Additional benefits and advantages of the disclosed embodiments will become apparent from the specification and drawing. The benefits and/or advantages may be individually obtained by the various embodiments and features of the specification and drawings, which need not all be provided in order to obtain one or more of such benefits and/or advantages.

BRIEF DESCRIPTION OF THE DRAWING

FIGURE is a cross-sectional view of a battery according to an embodiment of the present disclosure.

DETAILED DESCRIPTION (Underlying Knowledge Forming Basis of the Present Disclosure)

In recent years, studies have been actively conducted on coating-type all-solid-state batteries which can be increased in size. A coating-type all-solid-state battery includes, for example, a positive electrode layer which is disposed on a positive electrode current collector made of a metal foil and includes a positive electrode active material, a solid electrolyte, a binder, and a dispersing agent; a negative electrode layer which is disposed on a negative electrode current collector made of a metal foil and includes a negative electrode active material, a solid electrolyte, a binder, and a dispersing agent; and an electrolyte layer which is disposed between the positive electrode layer and the negative electrode layer and includes a solid electrolyte, a binder, and a dispersing agent. The dispersing agent included in the positive electrode layer, the negative electrode layer, and the electrolyte layer, for example, uniformly disperses powders or particles contained in these layers, thereby improving the characteristics of the battery and reducing variation. Examples of a combination of particles contained in these layers include a combination of particles of an active material and particles of another active material contained in the positive electrode layer or the negative electrode layer, a combination of particles of an active material and particles of a solid electrolyte, a combination of particles of a solid electrolyte and particles of another solid electrolyte, and a combination of particles of a solid electrolyte.

When a dispersing agent is added to a battery material, for example, the dispersibility of particles contained in the battery material is improved. However, in some cases, depending on the dispersing agent, the ionic conductivity of the solid electrolyte may be decreased. The ionic conductivity of an ordinary binder or dispersing agent is low and close to 0. Therefore, the binder or dispersing agent may hinder the ion conduction of the solid electrolyte and deteriorate the characteristics of the battery. For example, when a solid electrolyte, a binder, and a dispersing agent are uniformly dispersed, the ionic conductivity of the solid electrolyte may be rather decreased.

As a result of thorough studies, the present inventor has found that, by using, as a dispersing agent, a compound having an imidazoline ring and an aromatic ring and a molecular weight of less than 350, it is possible to improve dispersibility in a battery material and suppress a decrease in ionic conductivity of a solid electrolyte, and thus the characteristics of a battery can be improved.

That is, it is also an object of the present disclosure to provide a battery in which battery characteristics are improved by a battery material having improved dispersibility because of addition of a dispersing agent and also a decrease in ionic conductivity due to the dispersing agent is suppressed. In order to achieve the object, the present disclosure uses, as the dispersing agent, a compound having an imidazoline ring and an aromatic ring and a molecular weight of less than 350.

In the battery material according to the present disclosure, for example, it is possible to achieve both dispersibility and ionic conductivity which have a trade-off relationship.

(Summary of Aspects of the Present Disclosure)

A battery material according to a first aspect of the present disclosure includes a compound having an imidazoline ring and an aromatic ring and a molecular weight of less than 350.

According to the first aspect, since the battery material includes the compound having an imidazoline ring and an aromatic ring, dispersibility in the battery material is excellent. Furthermore, since the compound has a molecular weight of less than 350, the compound is easily sublimed or evaporated when a battery component is formed from the battery material. That is, the content of the compound in the battery component can be easily decreased. Thus, it is possible to easily improve ionic conductivity in the battery.

According to a second aspect of the present disclosure, for example, in the battery material according to the first aspect, the compound may be 2-benzylimidazoline. According to the second aspect, dispersibility in the battery material is excellent. According to the battery material, it is possible to easily improve ionic conductivity in the battery.

According to a third aspect of the present disclosure, for example, the battery material according to the first or second aspect may further include a solid electrolyte. According to the third aspect, the dispersibility of the solid electrolyte in the battery material is excellent. According to the battery material, it is possible to easily improve the ionic conductivity of the solid electrolyte in the battery.

According to a fourth aspect of the present disclosure, for example, in the battery material according to the third aspect, the solid electrolyte may have a particle shape, and the compound may be located between a plurality of particles of the solid electrolyte. According to the fourth aspect, the dispersibility of the solid electrolyte in the battery material is excellent. According to the battery material, it is possible to easily improve the ionic conductivity of the solid electrolyte in the battery.

According to a fifth aspect of the present disclosure, for example, the battery material according to any one of the first to fourth aspects may be a slurry. According to the fifth aspect, a battery component can be easily formed from the battery material.

A battery according to a sixth aspect of the present disclosure includes:
an electrode layer, and
an electrolyte layer,
in which at least one selected from the group consisting of the electrode layer and the electrolyte layer includes a compound having an imidazoline ring and an aromatic ring and a molecular weight of less than 350.

According to the sixth aspect, in the electrode layer or the electrolyte layer, a layer material is uniformly dispersed. Furthermore, the electrode layer or the electrolyte layer has high ionic conductivity.

A method for producing a battery material according to a seventh aspect of the present disclosure includes mixing a solid electrolyte and a compound having an imidazoline ring and an aromatic ring and a molecular weight of less than 350.

According to the seventh aspect, the dispersibility of the solid electrolyte in the battery material is excellent. According to the battery material, it is possible to easily improve the ionic conductivity of the solid electrolyte in the battery.

(Embodiments of the Present Disclosure)

Hereinafter, a battery material, a battery, and an electrolyte layer, a positive electrode layer, and a negative electrode layer constituting the battery in the embodiments of the present disclosure will be described in detail with reference to the drawing. Note that each of the embodiments described below shows a general or specific example. Numerical values, shapes, materials, constituent elements, arrangement and connection of constituent elements, steps, and the like shown in the following embodiments are merely examples, and are not intended to limit the present disclosure. Among the constituent elements in the embodiments below, any constituent element which is not described in an independent claim that represents a concept of the highest order is described as an optional constituent element.

[Battery Material]

A battery material according to an embodiment includes a compound having an imidazoline ring and an aromatic ring and a molecular weight of less than 350. Imidazoline is, for example, a nitrogen-containing heterocyclic compound derived from imidazole. In the present specification, "a compound having an imidazoline ring and an aromatic ring and a molecular weight of less than 350" may be referred to as "a compound A".

In the compound A, the aromatic ring is, for example, composed of carbon atoms. The aromatic ring may be monocyclic or polycyclic. The number of carbon atoms in the aromatic ring is not particularly limited, and for example, is greater than or equal to 6 and less than or equal to 14. Examples of the aromatic ring include a benzene ring, a naphthalene ring, and an anthracene ring.

In the compound A, the imidazoline ring has, for example, a substituent containing the aromatic ring. In the present specification, "a substituent containing an aromatic ring" may be referred to as "a substituent B". The substituent B is not particularly limited as long as it contains an aromatic ring. The substituent B is, for example, composed of carbon atoms and hydrogen atoms. The number of carbon atoms in the substituent B is not particularly limited, and may be greater than or equal to 6 and less than or equal to 20, or greater than or equal to 6 and less than or equal to 15. The substituent B is, for example, a benzyl group.

In the compound A, the imidazoline ring may have a plurality of substituents B. In this case, the plurality of substituents B may be the same or different. The imidazoline ring may have a substituent other than the substituent B.

2-Benzylimidazoline is a specific example of the compound A.

The molecular weight of the compound A is not particularly limited as long as it is less than 350. The molecular weight of the compound A may be greater than or equal to 146 and less than or equal to 200.

The boiling point of the compound A may be lower than or equal to 250° C., or lower than or equal to 200° C. The boiling point of the compound A may be higher than or equal to 150° C.

The content of the compound A in the battery material may be more than or equal to 0.1% by mass and less than or equal to 20% by mass, or more than or equal to 0.1% by mass and less than or equal to 1.0% by mass.

The battery material according to the embodiment can be used to form a positive electrode layer, a negative electrode layer, or an electrolyte layer. In the present specification, each of a positive electrode layer and a negative electrode layer may be simply referred to as "an electrode layer".

1. Battery Material Used to Form Positive Electrode Layer

A battery material used to form a positive electrode layer further includes, in addition to the compound A, a positive electrode active material, a solid electrolyte, and a solvent. Each of the positive electrode active material and the solid electrolyte has, for example, particle shape. In the battery material, for example, particles of the positive electrode active material and particles of the solid electrolyte are dispersed in the solvent. That is, the battery material may be a slurry of particles of the positive electrode active material and particles of the solid electrolyte. In the present specification, a battery material used to form a positive electrode layer may be referred to as "a positive electrode slurry". The positive electrode slurry may further include a binder.

(a) Positive Electrode Active Material

As the positive electrode active material, a lithium-containing transition metal oxide, a lithium-containing transition metal phosphate, or the like is used. Examples of the lithium-containing transition metal oxide include $LiCoO_2$, $LiNiO_2$, and $LiMn_2O_4$. Examples of the lithium-containing transition metal phosphate include $LiCoPO_4$, $LiNiPO_4$, $LiFePO_4$, and $LiMnPO_4$. Compounds obtained by replacing the transition metal of these compounds with one or two or more hetero-elements can also be used as the positive electrode active material. Specifically, compounds, such as $LiNi_{1/3}Co_{1/3}Mn_{1/3}O_2$, $LiNi_{0.8}Co_{0.15}Al_{0.05}O_2$, and $LiNi_{0.5}Mn_{1.5}O_2$, can be used as the positive electrode active material. For the purpose of improving the rate characteristics, the surface of the positive electrode active material may be coated with an oxide solid electrolyte. As the oxide solid electrolyte, for example, $LiNbO_3$ may be used.

The average particle size of particles of the positive electrode active material is not particularly limited, and for example, is more than or equal to 2 μm and less than or equal to 20 μm. In the present specification, the average particle size of particles can be calculated by the following method. A particle group is observed with an electron microscope, and the area of a specific particle in an electron microscope image is calculated by image processing. The diameter of a circle that has an area equivalent to the calculated area is defined as a diameter of the specific particle. Diameters of an arbitrary number of particles (e.g., 10 particles) are calculated, and an average value thereof is defined as an average particle size of the particles. The average particle size of particles may be a particle size (D50) corresponding to a cumulative volume of 50% in a particle size distribution measured by an image analysis-type particle size distribution analyzer.

(b) Solid Electrolyte

As the solid electrolyte, an inorganic solid electrolyte can be used. The solid electrolyte may be a sulfide solid electrolyte, an oxide solid electrolyte, or a halide solid electrolyte.

Examples of the sulfide solid electrolyte include $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$. In the case where the sulfide solid electrolyte contains Li, P, and S, a sulfide solid electrolyte which has high lithium ion conductivity and is relatively soft can be obtained. When the solid electrolyte is moderately soft, it is possible to gain a sufficient area of an interface between the solid electrolyte and the active material.

In the embodiment, the sulfide solid electrolyte can be a sulfide glass-ceramic containing $Li_2S$ and $P_2S_5$. The ratio of $Li_2S$ to $P_2S_5$ ($Li_2S:P_2S_5$) in terms of mole is, for example, in the range of 70:30 to 80:20 and may be in the range of 75:25 to 80:20. By appropriately adjusting the ratio of $Li_2S$ to $P_2S_5$, it is possible to obtain a sulfide solid electrolyte having a crystal structure with high ionic conductivity while maintaining the lithium concentration that influences the battery characteristics.

Examples of the oxide solid electrolyte include LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}TiO_{0.74}$, and $Li_{1.5}Al_{0.5}Ge_{1.5}(PO_4)_3$.

Examples of the halide solid electrolyte include $Li_3InBr_6$, $Li_3InCl_6$, $Li_2FeCl_4$, $Li_2CrCl_4$, and $Li_3OCl$.

In the positive electrode slurry, the ratio of the solid electrolyte to the positive electrode active material (solid electrolyte:positive electrode active material) in terms of mass is, for example, in the range of 50:50 to 5:95, and may be in the range of 30:70 to 10:90. By appropriately adjusting the ratio of the solid electrolyte to the positive electrode active material, it is possible to achieve both lithium ion conductivity and electronic conductivity in the positive electrode layer.

The average particle size of particles of the solid electrolyte is not particularly limited, and for example, is more than or equal to 0.1 μm and less than or equal to 20 μm.

(c) Solvent

The type of the solvent is not particularly limited. The solvent is required to have properties such as being hard to react with the solid electrolyte and the active material, low polarity, easiness in slurry coating, and having a boiling point that facilitates easy removal by drying. The solvent may be an organic solvent. Specific examples of the solvent include 1,2,3,4-tetrahydronaphthalene (Tetralin), anisole, xylene, octane, hexane, decalin, butyl acetate, ethyl propionate, and tripropylamine. It is recommended to use a nonpolar solvent, such as Tetralin.

(d) Binder

The binder improves adhesion between particles of materials constituting the battery. The binder may be a resin material. The binder includes, for example, at least one selected from the group consisting of polyvinylidene fluoride, a vinylidene fluoride-hexafluoropropylene copolymer, a vinylidene fluoride-tetrafluoroethylene copolymer, polytetrafluoroethylene, carboxymethyl cellulose, polyacrylic acid, styrene-butadiene copolymer rubber, polypropylene, polyethylene, and polyimide.

The positive electrode slurry may include another material, such as a conductive assistant, e.g., acetylene black, ketjen black, carbon nanotubes, or carbon nanofibers.

2. Battery Material Used to Form Negative Electrode Layer

A battery material used to form a negative electrode layer further includes, in addition to the compound A, a negative electrode active material, a solid electrolyte, and a solvent. Each of the negative electrode active material and the solid electrolyte has, for example, a particle shape. In the battery material, for example, particles of the negative electrode active material and particles of the solid electrolyte are dispersed in the solvent. That is, the battery material may be a slurry of particles of the negative electrode active material and particles of the solid electrolyte. In the present specification, a battery material used to form a negative electrode layer may be referred to as "a negative electrode slurry". The negative electrode slurry may further include a binder.

As the negative electrode active material, lithium, a metal that is easily alloyed with lithium, a carbon material, $Li_4Ti_5O_{12}$, $SiO_x$ (x<2), or the like can be used. Examples of the metal that is easily alloyed with lithium include indium, tin, and silicon. Examples of the carbon material include hard carbon and graphite.

The average particle size of particles of the negative electrode active material is not particularly limited, and for example, is more than or equal to 2 μm and less than or equal to 40 μm.

As the solid electrolyte, the solvent, and the binder, materials that can be used in the positive electrode slurry can also be used in the negative electrode slurry. However, the composition of the solid electrolyte contained in the positive electrode slurry may be different from the composition of the solid electrolyte contained in the negative electrode slurry. The composition of the solvent contained in the positive electrode slurry may be different from the composition of the solvent contained in the negative electrode slurry. The composition of the binder contained in the positive electrode slurry may be different from the composition of the binder contained in the negative electrode slurry. The negative electrode slurry may not include a solid electrolyte.

In the negative electrode slurry, the ratio of the solid electrolyte to the negative electrode active material (solid electrolyte:negative electrode active material) in terms of mass is, for example, in the range of 5:95 to 60:40, and may be in the range of 30:70 to 50:50. By appropriately adjusting the ratio of the solid electrolyte to the negative electrode active material, it is possible to achieve both lithium ion conductivity and electronic conductivity in the negative electrode layer.

The negative electrode slurry may include another material, such as a conductive assistant, e.g., acetylene black, ketjen black, carbon nanotubes, or carbon nanofibers.

3. Battery Material Used to Form Electrolyte Layer

A battery material used to form an electrolyte layer further includes, in addition to the compound A, a solid electrolyte and a solvent. The solid electrolyte has, for example, a particle shape. In the battery material, for example, particles of the solid electrolyte are dispersed in the solvent. That is, the battery material may be a slurry of particles of the solid electrolyte. In the present specification, a battery material used to form an electrolyte layer may be referred to as "an electrolyte slurry". The electrolyte slurry may further include a binder.

As the solid electrolyte, the solvent, and the binder, materials that can be used in the positive electrode slurry can also be used in the electrolyte slurry. However, the composition of the solid electrolyte contained in the positive electrode slurry may be different from the composition of the solid electrolyte contained in the electrolyte slurry. The composition of the solvent contained in the positive electrode slurry may be different from the composition of the solvent contained in the electrolyte slurry. The composition of the binder contained in the positive electrode slurry may be different from the composition of the binder contained in the electrolyte slurry.

A method for producing a battery material will be described below.

A method for producing a battery material according to an embodiment includes mixing a solid electrolyte and a compound A. Specifically, a positive electrode slurry can be obtained by mixing a compound A, a positive electrode active material, a solid electrolyte, a binder, and a solvent. A negative electrode slurry can be obtained by mixing a compound A, a negative electrode active material, a solid electrolyte, a binder, and a solvent. An electrolyte slurry can be obtained by mixing a compound A, a solid electrolyte, a binder, and a solvent.

The method of mixing materials is not particularly limited. For example, the materials may be mixed using a mixing device, such as a ball mill, a rotary mixer, a double arm mixer, or a kneader.

Since the battery material according to the embodiment includes the compound A, dispersibility of particles of the solid electrolyte and particles of the active material is excellent. For example, in the compound A, the imidazoline ring has a high affinity for particles of the solid electrolyte and particles of the active material. In the compound A, the aromatic ring has a high affinity for the solvent. In the case where a substituent B is a benzyl group, the substituent B has a particularly high affinity for the solvent. Accordingly, particles of the solid electrolyte and particles of the active material are easily dispersed in the solvent by the imidazoline ring and the aromatic ring of the compound A. In the battery material, the compound A may be located between a plurality of particles of the solid electrolyte, between a plurality of particles of the active material, and between particles of the solid electrolyte and particles of the active material.

As described above, the battery material according to the embodiment has excellent dispersibility of particles of the solid electrolyte and particles of the active material. Therefore, the D10, D50, and D90 of particles of the solid electrolyte in the battery material according to the embodiment are respectively smaller than the D10, D50, and D90 of particles of a solid electrolyte in a battery material which does not include the compound A. The D10, D50, and D90 of particles of the active material in the battery material according to the embodiment are respectively smaller than the D10, D50, and D90 of particles of an active material in a battery material which does not include the compound A. Note that the D10 means a particle size corresponding to a cumulative volume of 10% in a particle size distribution measured by an image analysis-type particle size distribution analyzer. The D50 means a particle size corresponding to a cumulative volume of 50% in the particle size distribution. The D90 means a particle size corresponding to a cumulative volume of 90% in the particle size distribution.

In the battery material, each of the particle size distribution of particles of the solid electrolyte and the particle size distribution of particles of the active material has sharp peaks. For example, in each of the particle size distribution of particles of the solid electrolyte and the particle size distribution of particles of the active material, the value (D90−D10)/D50 may be less than or equal to 3.0, or may be less than or equal to 2.0. The lower limit of (D90−D10)/D50 is not particularly limited, and for example, is 0.5.

[Battery]

A battery according to an embodiment will be described below.

FIGURE shows a cross section of a battery 100 according to an embodiment of the present disclosure. The battery 100 includes a positive electrode 10, a negative electrode 20, and an electrolyte layer 30. The electrolyte layer 30 is disposed between the positive electrode 10 and the negative electrode 20. The positive electrode 10, the electrolyte layer 30, and the negative electrode 20 are stacked in this order. The positive electrode 10 has a positive electrode current collector 12 and a positive electrode layer 14. The positive electrode layer 14 is disposed on the positive electrode current collector 12. The negative electrode 20 has a negative electrode current collector 22 and a negative electrode layer 24. The negative electrode layer 24 is disposed on the negative electrode current collector 22. The electrolyte layer 30 is disposed between the positive electrode layer 14 and the negative electrode layer 24. The electrolyte layer 30 is in contact with each of the positive electrode layer 14 and the negative electrode layer 24. The electrolyte layer 30 may be composed of a solid electrolyte or composed of a liquid electrolyte. In the case where all the electrolytes used in the battery 100 are solid electrolytes, the battery 100 can be an all-solid-state battery. For example, at least one selected from the electrode layers and the electrolyte layer 30 includes a compound A. Each of the positive electrode layer 14, the negative electrode layer 24, and the electrolyte layer 30 may include the compound A.

1. Current Collector

Each of the positive electrode current collector 12 and the negative electrode current collector 22 is made of a material having electronic conductivity. The material of the positive electrode current collector 12 may be the same as or different from the material of the negative electrode current collector 22. Examples of the material having electronic conductivity include a metal, carbon, and a conductive resin. Examples of the metal include copper, stainless steel, aluminum, nickel, titanium, lithium, and indium. As the material for each of the positive electrode current collector 12 and the negative electrode current collector 22, typically, copper or a copper alloy can be used. The shape of each of the positive electrode current collector 12 and the negative electrode current collector 22 is not particularly limited, and each of the current collectors may be foil-shaped or mesh-shaped.

2. Positive Electrode Layer

The positive electrode layer 14 includes, for example, a compound A, a positive electrode active material 16, a binder 18, and a solid electrolyte 32. However, as will be described later, the compound A contained in the positive electrode slurry may be sublimed or evaporated when the positive electrode layer 14 is formed. The content of the compound A in the positive electrode layer 14 may be less than or equal to 1% by mass. The positive electrode layer 14 may not substantially include the compound A. When the content of the compound A in the positive electrode layer 14 is low, the positive electrode layer 14 exhibits high ionic conductivity.

The positive electrode active material 16 and the solid electrolyte 32 may be bonded by the binder 18. Although not shown in FIGURE, by the binder 18, the positive electrode active material 16 and the positive electrode current collector 12 may be bonded, the solid electrolyte 32 and the positive electrode current collector 12 may be bonded, the positive electrode active material 16 and the positive electrode active material 16 may be bonded, and the solid electrolyte 32 and the solid electrolyte 32 may be bonded. In other words, in the positive electrode 10, the binder 18 can be present between the positive electrode active material 16 and the positive electrode current collector 12, between the solid electrolyte 32 and the positive electrode current collector 12, between the positive electrode active material 16 and the positive electrode active material 16, and between the solid electrolyte 32 and the solid electrolyte 32. The positive electrode layer 14 may further include the conductive assistant described above.

In the positive electrode layer 14, particles of the positive electrode active material 16 and particles of the solid electrolyte 32 are, for example, uniformly dispersed. Therefore, the positive electrode layer 14 has, for example, a smooth surface.

3. Negative Electrode Layer

The negative electrode layer 24 includes, for example, a compound A, a negative electrode active material 26, a binder 18, and a solid electrolyte 32. The content of the compound A in the negative electrode layer 24 may be less than or equal to 1% by mass. The negative electrode layer 24 may not substantially include the compound A. When the content of the compound A in the negative electrode layer 24 is low, the negative electrode layer 24 exhibits high ionic conductivity.

The negative electrode active material 26 and the solid electrolyte 32 may be bonded by the binder 18. Although not shown in FIGURE, by the binder 18, the negative electrode active material 26 and the negative electrode current collector 22 may be bonded, the solid electrolyte 32 and the negative electrode current collector 22 may be bonded, the negative electrode active material 26 and the negative electrode active material 26 are bonded, and the solid electrolyte 32 and the solid electrolyte 32 may be bonded. In other words, in the negative electrode 20, the binder 18 can be present between the negative electrode active material 26 and the negative electrode current collector 22, between the solid electrolyte 32 and the negative electrode current collector 22, between the negative electrode active material 26 and the negative electrode active material 26, and between the solid electrolyte 32 and the solid electrolyte 32.

In the negative electrode layer 24, particles of the negative electrode active material 26 and particles of the solid electrolyte 32 are, for example, uniformly dispersed. Therefore, the negative electrode layer 24 has, for example, a smooth surface.

The shape of the negative electrode active material 26 is not limited to a particle shape. A negative electrode active material having another shape, such as a foil shape or mesh shape, can be used in the negative electrode layer 24. The negative electrode layer 24 may further include the conductive assistant described above.

4. Electrolyte Layer

The electrolyte layer 30 has a function of electrically insulating the positive electrode 10 and the negative electrode 20 from each other. The electrolyte layer 30 is made of a material having ionic conductivity. When the battery 100 is a lithium-ion battery, the electrolyte layer 30 has lithium ion conductivity.

The electrolyte layer 30 includes, for example, a compound A, a binder 18, and a solid electrolyte 32. The content of the compound A in the electrolyte layer 30 may be less than or equal to 1% by mass. The electrolyte layer 30 may not substantially include the compound A. When the content of the compound A in the electrolyte layer 30 is low, the electrolyte layer 30 has high ionic conductivity.

The solid electrolyte 32 and the solid electrolyte 32 may be bonded by the binder 18. In other words, in the electrolyte layer 30, the binder 18 can be present between the solid electrolyte 32 and the solid electrolyte 32.

In the electrolyte layer 30, particles of the solid electrolyte 32 are, for example, uniformly dispersed. Therefore, the electrolyte layer 30 has, for example, a smooth surface.

A method for producing a battery 100 will be described below.

First, a positive electrode 10, a negative electrode 20, and an electrolyte layer 30 are formed by the following methods.

In order to form the positive electrode 10, a positive electrode slurry is prepared by the method described above. Next, the positive electrode slurry is applied onto a positive electrode current collector 12 by a coating method, such as blade coating, to form a coating film. By drying the coating film, a positive electrode layer 14 is formed. Thus, the positive electrode 10 is obtained. The coating film is dried, for example, by heating the coating film. The heating temperature of the coating film may be higher than or equal to 80° C. and lower than or equal to 250° C., or higher than or equal to 130° C. and lower than or equal to 230° C. The heating time of the coating film is, for example, more than or equal to 5 minutes and less than or equal to 1 hour. Since the compound A has a low molecular weight, the compound A is easily sublimed or evaporated by heating the coating film. Therefore, by heating the coating film, the content of the compound A in the coating film is easily decreased. In the resulting positive electrode layer 14, since the content of the compound A is low, high ionic conductivity can be achieved.

The negative electrode 20 can also be formed by the same method as that of the positive electrode 10 except that the positive electrode slurry is changed to a negative electrode slurry, and the positive electrode current collector 12 is changed to a negative electrode current collector 22.

The electrolyte layer 30 can also be formed by the same method as that of the positive electrode 10 except that the positive electrode slurry is changed to an electrolyte slurry. The electrolyte layer 30 may be formed directly on the positive electrode layer 14 or the negative electrode layer 24. Alternatively, the electrolyte layer 30 may be formed on a support, such as a resin film.

Next, the positive electrode 10, the electrolyte layer 30, and the negative electrode 20 are stacked such that the electrolyte layer 30 is disposed between the positive electrode layer 14 and the negative electrode layer 24, thereby obtaining a multilayer body. The multilayer body is formed by pressing so that the positive electrode 10, the electrolyte layer 30, and the negative electrode 20 adhere closely to one another. Thus, the battery 100 is obtained. After attaching a terminal to each of the positive electrode 10 and the negative electrode 20, the battery 100 may be housed in a case.

Examples of the material for the case of the battery 100 include an aluminum foil laminated with a resin film, a metal, such as stainless steel, iron, or aluminum, and a resin.

The present disclosure does not require that all of the positive electrode slurry, the negative electrode slurry, and the electrolyte slurry include the compound A. When at least one selected from the positive electrode slurry, the negative electrode slurry, and the electrolyte slurry includes the compound A, the desired effects can be obtained.

The battery 100 is not limited to an all-solid-state battery. Even in the case where an electrolytic solution is used, instead of the solid electrolyte, in the battery 100, as long as the compound A is contained in the positive electrode slurry and/or the negative electrode slurry, the desired effects can be obtained.

In the case where the battery 100 is an all-solid-state battery, the all-solid-state battery includes, for example, a positive electrode current collector 12 made of a metal foil, a positive electrode layer 14 including a positive electrode active material formed on the positive electrode current collector 12, a negative electrode current collector 22 made of a metal foil, a negative electrode layer 24 including a negative electrode active material formed on the negative electrode current collector 22, and an electrolyte layer 30 including at least a solid electrolyte having ionic conductivity disposed between the positive electrode layer 14 and the negative electrode layer 24. According to the embodiment, at least one layer selected from the group consisting of the positive electrode layer 14, the negative electrode layer 24, and the electrolyte layer 30 may include 2-benzylimidazoline.

EXAMPLES

Examples of the present disclosure will be described below. However, the examples are merely exemplary, and the present disclosure is not limited to the examples. Each step was performed in a glove box or dry room. The dew point in each of the glove box and the dry room was controlled to be equal to or lower than −45° C.

Example 1

(1) Preparation of Solid Electrolyte $75Li_2S$-$25P_2S_5$

First, $Li_2S$ and $P_2S_5$ were weighed such that the ratio of $Li_2S$ to $P_2S_5$ ($Li_2S$:$P_2S_5$) was 75:25 in terms of mole, pulverized using a mortar, and mixed. Then, the resulting mixture was subjected to milling treatment for 10 hours with a planetary ball mill to obtain a solid electrolyte in a glass state. Next, the solid electrolyte in a glass state was annealed in an inert gas atmosphere to obtain a solid electrolyte in a glass-ceramic state. The annealing temperature was determined with reference to the crystallization peak temperature of a solid electrolyte obtained by differential thermal analysis measurement.

Next, ionic conductivity of the resulting solid electrolyte was measured by an AC impedance method. The ionic conductivity of the solid electrolyte was $7.5 \times 10^{-4}$ S/cm.

(2) Preparation of Solid Electrolyte Samples for Measuring Ionic Conductivity

First, 2 g of the solid electrolyte $75Li_2S$-$25P_2S_5$ obtained in (1) was weighed. As a dispersing agent, 0.06 g of 2-benzylimidazoline was weighed. The molecular weight of 2-benzylimidazoline is 160. As a solvent, 4 g of anisole was weighed. Then, using a planetary mill, the solid electrolyte, the dispersing agent, and the solvent were kneaded at 1,600 rpm for 15 minutes. Thus, a battery material was obtained.

By heating the battery material at 100° C. for 1 hour, followed by drying, a solid electrolyte sample for measuring ionic conductivity was prepared. Furthermore, by changing the heating temperature of the battery material to 150° C. or 200° C., other solid electrolyte samples were prepared.

Comparative Example 1-1

Solid electrolyte samples in Comparative Example 1-1 were prepared by the same method as that of Example 1 except that instead of 2-benzylimidazoline, 2-(1-heptadecenyl)-4,5-dihydro-1H-imidazole-1-ethanol (DisperBYK109 manufactured by BYK Corporation) was added as a dispersing agent. The molecular weight of DisperBYK109 is 350.

Comparative Example 1-2

Solid electrolyte samples in Comparative Example 1-2 were prepared by the same method as that of Example 1 except that 2-benzylimidazoline was not used.

(Measurement of Li Ion Conductivity)

Li ion conductivity in each of the solid electrolyte samples obtained in Example 1, Comparative Example 1-1, and Comparative Example 1-2 was measured by an AC impedance method. The results thereof are shown in Table 1.

TABLE 1

| | Li ion conductivity (S/cm) | | |
|---|---|---|---|
| | Heating temperature 100° C. | Heating temperature 150° C. | Heating temperature 200° C. |
| Example 1 | $4.2 \times 10^{-4}$ | $5.1 \times 10^{-4}$ | $7.2 \times 10^{-4}$ |
| Comparative Example 1-1 | $3.3 \times 10^{-4}$ | $3.3 \times 10^{-4}$ | $4.2 \times 10^{-4}$ |
| Comparative Example 1-2 | $5.7 \times 10^{-4}$ | $7.5 \times 10^{-4}$ | $7.5 \times 10^{-4}$ |

As shown in Table 1, the solid electrolyte samples of Example 1 in which 2-benzylimidazoline was used as a dispersing agent had higher ionic conductivity than those of Comparative Example 1-1 in which DisperBYK109 was used as a dispersing agent. Furthermore, as is evident from Table 1, as the heating temperature increases, the ionic conductivity of the solid electrolyte sample in Example 1 improves. When the heating temperature was 200° C., the solid electrolyte sample in Example 1 had the same level of ionic conductivity as the solid electrolyte sample in Comparative Example 1-2 in which a dispersing agent was not contained.

Example 2

0.1 g of the solid electrolyte $75Li_2S$-$25P_2S_5$ prepared in Example 1 was weighed. As a dispersing agent, 0.003 g of 2-benzylimidazoline was weighed. As a solvent, 4 g of anisole was weighed. Then, using a planetary mill, the solid electrolyte, the dispersing agent, and the solvent were kneaded at 1,600 rpm for 15 minutes. The resulting mixture was diluted with anisole. The concentration of the solid electrolyte in the diluted mixture was 0.01% by weight. The diluted mixture was subjected to ultrasonic dispersion for 15 minutes. Thus, a battery material in the form of a slurry was obtained.

Comparative Example 2-1

A battery material in Comparative Example 2-1 was prepared by the same method as that of Example 2 except that instead of 2-benzylimidazoline, 2-(1-heptadecenyl)-4,5-dihydro-1H-imidazole-1-ethanol (DisperBYK109 manufactured by BYK Corporation) was added as a dispersing agent.

Comparative Example 2-2

A battery material in Comparative Example 2-2 was prepared by the same method as that of Example 2 except that 2-benzylimidazoline was not used.
(Particle Size Distribution Measurement)

Using an image analysis-type particle size distribution analyzer XPT-C manufactured by Nihon Rufuto Co., Ltd., particle size distribution of the solid electrolyte in the battery material obtained in each of Example 2, Comparative Example 2-1, and Comparative Example 2-2 was measured. Furthermore, in the particle size distribution obtained, a particle size corresponding to a cumulative volume of 10% (D10), a particle size corresponding to a cumulative volume of 50% (D50), a particle size corresponding to a cumulative volume of 90% (D90), and the value (D90−D10)/D50 were calculated. The results thereof are shown in Table 2.

TABLE 2

| | D10 (μm) | D50 (μm) | D90 (μm) | (D90 − D10)/D50 |
|---|---|---|---|---|
| Example 2 | 2.6 | 5.7 | 11.7 | 1.60 |
| Comparative Example 2-1 | 4.0 | 13.7 | 50.9 | 3.42 |
| Comparative Example 2-2 | 9.1 | 17.9 | 87.6 | 4.39 |

As shown in Table 2, the values D10, D50, D90, and (D90−D10)/D50 in the battery material of Example 2 in which 2-benzylimidazoline was used as a dispersing agent were lower than those in each of the battery material of Comparative Example 2-1 in which DisperBYK109 was used as a dispersing agent and the battery material of Comparative Example 2-2 in which a dispersing agent was not used. In particular, the value (D90−D10)/D50 in the battery material of Example 2 was about ½ of the value (D90−D10)/D50 in the battery material of Comparative Example 2-1. As is evident from the results, 2-benzylimidazoline has a more dispersing effect of particles of the solid electrolyte.

As described above, in the battery material according to the embodiment, the compound A can suppress aggregation and coarsening of particles contained in the battery material. That is, in the battery material according to the embodiment, particles are uniformly dispersed. Furthermore, in the battery material according to the embodiment, the content of the compound A in a battery component can be easily decreased. Therefore, a decrease in ionic conductivity can be suppressed, and a battery having good battery characteristics can be realized.

The battery according to the present disclosure has been described based on the embodiments and examples. However, the present disclosure is not limited to these embodiments and examples. Various modifications to the embodiments and examples conceived by those skilled in the art and embodiments constructed by combining some constituent elements in different embodiments and examples, without departing from the gist of the present disclosure, are intended to fall within the scope of the present disclosure.

The techniques according to the present disclosure can be applied to, for example, batteries in personal digital assistants, portable electronic devices, power storage apparatuses for household use, motorcycles, electric cars, and hybrid electric cars.

What is claimed is:

1. A battery material, which is at least one of a negative electrode layer and an electrolyte layer, comprising:
   a solid electrolyte made of a plurality of particles;
   a solvent comprising at least one selected from the group consisting of 1,2,3,4-tetrahydronaphthalene (Tetralin), anisole, xylene, octane, hexane, decalin, butyl acetate, ethyl propionate, and tripropylamine; and
   a compound having an imidazoline ring and an aromatic ring, and having a molecular weight of less than 350,
   wherein
   the compound is a dispersing agent located between the plurality of particles of the solid electrolyte,
   when the battery material is the negative electrode layer, a content of the compound in the negative electrode layer is more than or equal to 0.1% by mass and less than or equal to 20% by mass, and
   when the battery material is the electrolyte layer, the electrolyte layer is disposed between a positive electrode layer and a negative electrode layer, and a content of the compound in the electrolyte layer is more than or equal to 0.1% by mass and less than or equal to 20% by mass.

2. The battery material according to claim 1, wherein the compound is 2-benzylimidazoline.

3. The battery material according to claim 1, wherein the battery material is a slurry.

4. A battery comprising:
   a negative electrode layer;
   a solvent comprising at least one selected from the group consisting of 1,2,3,4-tetrahydronaphthalene (Tetralin), anisole, xylene, octane, hexane, decalin, butyl acetate, ethyl propionate, and tripropylamine; and
   an electrolyte layer disposed between a positive electrode layer and the negative electrode layer,
   wherein at least one selected from the group consisting of the negative electrode layer and the electrolyte layer includes:
   a solid electrolyte made of a plurality of particles; and
   a compound having an imidazoline ring and an aromatic ring, and having a molecular weight of less than 350, and
   the compound is a dispersing agent located between the plurality of particles of the solid electrolyte.

5. The battery according to claim 4, wherein the compound is 2-benzylimidazoline.

6. The battery material according to claim 1, wherein the solvent includes anisole.

7. The battery material according to claim 1, wherein atoms constituting the aromatic ring consist of carbon atoms.

8. The battery material according to claim 1, wherein a number of carbon atoms in the aromatic ring is greater than or equal to 6 and less than or equal to 14.

9. The battery according to claim 4, wherein the negative electrode layer includes the solid electrolyte and the compound, and a content of the compound in the negative electrode layer is more than or equal to 0.1% by mass and less than or equal to 20% by mass.

10. The battery according to claim 4, wherein the electrolyte layer includes the solid electrolyte and the compound, and a content of the compound in the electrolyte layer is more than or equal to 0.1% by mass and less than or equal to 20% by mass.

\* \* \* \* \*